(12) United States Patent
Britt, Jr.

(10) Patent No.: US 8,522,977 B1
(45) Date of Patent: Sep. 3, 2013

(54) METHOD AND SYSTEM FOR PROTECTIVE RADIO FREQUENCY SHIELDING PACKAGING

(75) Inventor: Joe Freeman Britt, Jr., Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/609,297

(22) Filed: Sep. 11, 2012

(51) Int. Cl.
*B65D 85/00* (2006.01)
*G08B 13/14* (2006.01)

(52) U.S. Cl.
USPC ............ 206/459.1; 206/719; 340/572.8

(58) Field of Classification Search
USPC ...... 206/459.1, 523, 524, 719–721; 235/375, 235/380, 487, 492; 340/10.1–10.3, 572.1, 340/572.7, 572.8; 343/841; 174/377–380
See application file for complete search history.

(56) References Cited

U.S. PATENT DOCUMENTS

| | | | | |
|---|---|---|---|---|
| 2,766,920 A | * | 10/1956 | Rawley | .......... 206/719 |
| 4,890,763 A | * | 1/1990 | Curiel | .......... 206/459.1 |
| 6,121,544 A | * | 9/2000 | Petsinger | .......... 206/709 |
| 7,719,425 B2 | | 5/2010 | Colby | |
| 2006/0187060 A1 | * | 8/2006 | Colby | .......... 340/572.8 |
| 2006/0254815 A1 | | 11/2006 | Humphrey et al. | |
| 2006/0278551 A1 | * | 12/2006 | Bianchini et al. | .......... 206/463 |
| 2007/0109130 A1 | | 5/2007 | Edenfield | |
| 2008/0186186 A1 | | 8/2008 | Campbell | |
| 2009/0256680 A1 | * | 10/2009 | Kilian | .......... 206/719 |
| 2010/0102966 A1 | * | 4/2010 | Skowronek et al. | .......... 340/572.8 |
| 2010/0230018 A1 | | 9/2010 | Nielsen | |
| 2010/0263179 A1 | | 10/2010 | Boldin | |
| 2012/0211397 A1 | * | 8/2012 | Kilian | .......... 206/719 |

OTHER PUBLICATIONS

Rolf et al., "Near Field Communication (NFC) for Mobile Phones," Master of Science Thesis, Department of Electroscience, Lund University, pp. 1-166, Aug. 2006.

* cited by examiner

*Primary Examiner* — Bryon Gehman
(74) *Attorney, Agent, or Firm* — Morris & Kamlay LLP

(57) ABSTRACT

Disclosed is a packaging system for protecting a radio frequency readable label from being read while the label is on or embedded within a packaged product. The product packaging may include a shielding member that is rendered unusable upon removal of the product from the packaging. The radio frequency readable product label may be on or in a product, and contain information related to the product, such as product identification.

15 Claims, 2 Drawing Sheets

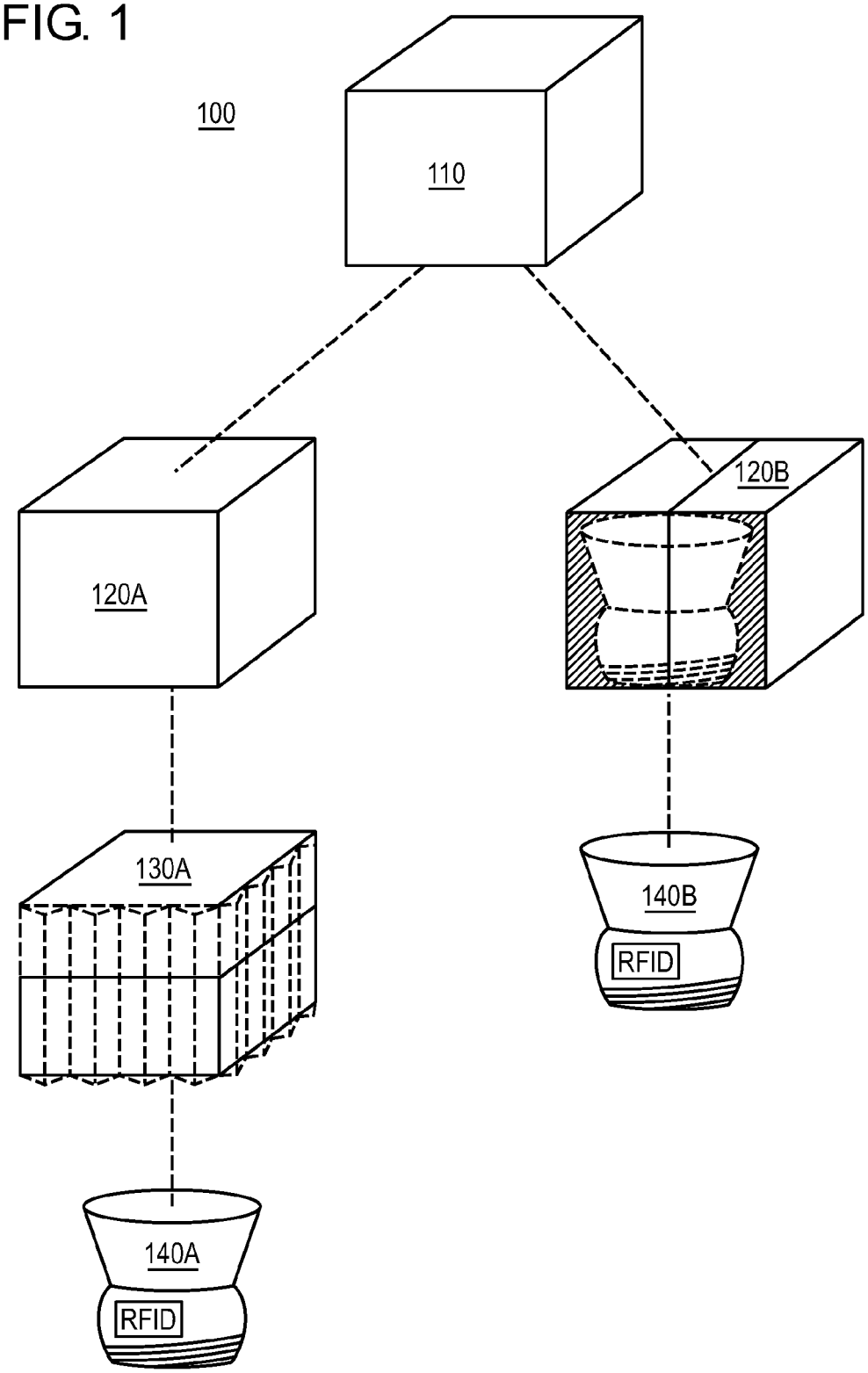

200

```
┌─────────────────────────────────────┐
│ an outer container of the package   │   210
│ may be provided                     │
└─────────────────────────────────────┘
                  │
                  ▼
┌─────────────────────────────────────┐
│ An inner container disposed may be  │
│ within the outer container, the     │
│ inner container may have a one-time │
│ shielding member disposed to        │   220
│ obscure a radio frequency readable  │
│ tag of a product from a radio       │
│ frequency tag reader                │
└─────────────────────────────────────┘
```

FIG. 2

METHOD AND SYSTEM FOR PROTECTIVE RADIO FREQUENCY SHIELDING PACKAGING

BACKGROUND

Radio Frequency Identification (RFID) tags may be used in a number of different applications. The RFID tag may be read from relatively close distance, such as 10 meters or less. The RFID tag may be an unpowered tag that responds to energy emitted from a RFID reader device. In addition to RFID tags, Near Field Communication (NFC) tags provide similar functionality, and are based on standards related to RFID tags. NFC tags are not readable at the extended distances as RFID tags, but have similar data capabilities as the RFID tag. In this regard, NFC tags are considered to be more secure. NFC readers are presently incorporated into portable devices, such as smartphones, to allow a user to purchase items by swiping the device over an NFC tag.

The NFC tag may also be substituted for barcodes and other marks on packages and products. The NFC tag has certain advantages over other forms of tags, e.g., RFID, or markings, (e.g., barcode or QR) because a reader only has to be in close proximity to, and not aligned with, the NFC tag to read the tag information. However, it is also possible that the NFC tag may be read surreptitiously by a potential hacker. For example, in the case of a credit card, the potential hacker may be able to read an NFC-enabled credit card through a wallet and clothing by coming into close proximity to a person carrying the NFC-enabled credit card. Additionally, products with NFC tags may also be read through packaging. In this case, the potential hacker may obtain information identifying the product and use that information to exploit the use of the product by a legitimate purchaser at a later date. For example, if the product were a door lock that responded to remote commands or a web camera, the potential hacker may be able to take control of the door lock or use the web camera to spy on the purchaser.

The NFC tag may be shielded from being read by covering the NFC tag with a covering that prevents a NFC reader from reading the NFC tag. However, the covering may be easily removed and replaced thereby allowing repeated reading of the tag.

BRIEF SUMMARY

According to an implementation of the disclosed subject matter, a system including an outer container and an inner container is provided. The inner container may have a shielding member obscuring the radio frequency readable tag from a radio frequency tag reader. The system may be adapted such that the removal of the product from the outer container may render the shielding member unusable.

The inner container may conform to the shape of the product with the shielding member covering the radio frequency readable tag. In addition, the inner container may fit within the outer container. The inner container and the shielding member may be combined in a metallized paper or metallized plastic. The inner container may be paper or plastic, and the shielding member may be smooth or corrugated. The inner container may be corrugated, and positioned within the outer container at an angle of a few degrees or greater from an end of the outer container.

The shielding member may be a one-time shielding member. The one-time shielding member may be corrugated and may be adapted to tear when the product is removed from the outer container. The shielding member may be incorporated into the inner container, and the inner container may be adapted to break along partition lines during removal of the product from the outer container. The inner container may include a mesh shielding member that may obscure the readable tag. The inner container may be a shrinkable material that conforms to the exterior dimensions of the product. The inner container may be a brittle material that may break when the product is removed from the inner container. Alternatively, the shielding member may be a brittle material that breaks when the product is removed.

The radio frequency readable tag may be a near field communication tag or a radio frequency identification tag.

Disclosed is an implementation providing a method of packaging a product. The method may include providing an outer container for the package. An inner container may be provided that is disposed within the outer container, the inner container having a one-time shielding member disposed to obscure a radio frequency readable tag of a product from a radio frequency tag reader. The removal of the product from the outer container may render the shielding unusable as subsequent shielding.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 1 shows examples of protective packaging systems according to implementations of the disclosed subject matter.

FIG. 2 discloses an example of a method for packaging a product according to an implementation of the presently disclosed subject matter.

DETAILED DESCRIPTION

Different types of products may be incorporated into a home automation system. Examples of home automation products may include a light bulb, a door lock, a lamp, an appliance, a security camera, a web camera, or the like. A radio frequency readable tag or label, such as an RFID or NFC tag, may be affixed to or embedded within a home automation system product, and may have data for identifying the product to the home automation system. A reader device may interrogate the tag, and obtain identifying data related to the product from some distance. In a retail store, an unprotected NFC tag may be read through the packaging from a short distance away by a reader device. Alternatively, if the NFC tag is protected in shielded packaging, a potential hacker may simply unpack the product, read the identifying data on the NFC tag and re-package the product. The potential hacker may use the identifying data to take control of the product once it is installed in a purchaser's residence or office, or perhaps to eavesdrop.

Accordingly, there is a need for a product package that prevents an NFC tag from being read through the packaging, and also alerts a perspective purchaser if the product has been previously unpacked.

Disclosed is a packaging system for protecting a radio frequency readable tag or label on a product from being read while the product is in product packaging. The radio frequency readable product tag may be on or in a product, and may contain information related to the product, such as product identification, security code for accessing product, a product assistance website.

FIG. 1 shows examples of protective packaging systems according to an implementation of the disclosed subject matter. The protective packaging system 100 may include an outer container 110, an inner container 120A, and a one-time shield 130A. In another implementation, the protective packaging system 100 may include an outer container 110, and inner container 120B. A product 140A, 140B with a readable tag, such as a light bulb, may be packed in the protective packaging 100. Of course, the product with the readable tag 140A, 140B may be a light bulb, a door lock, a lamp, an appliance, a security camera, a web camera, or the like. Although, the product 140A is shown with the readable tag labeled "RFID," the readable tag may be a NFC tag, or the like.

The outer container 110 may be made of metal, cardboard, or a plasticized material that may include indicia for identifying the product 140A. The inner container 120A may be a cardboard or plasticized material used for rigidity or extra structural protection of the product 140A. Although shown as a rectangular container, the outer container 110 may be any shape suitable for properly containing the product. For example, the outer container 110 may be cylindrical shaped to pack a cylindrical product, rectangular-shaped for packing a door handle and lock, or other polygonal volumes suitable for packaging products. The inner container 120A may be configured to fit within the outer container 110. Accordingly, the dimensions of the outer container 110 may be greater than those of the inner container 120A to allow the inner container 120A to fit within the outer container 110. The inner container 120A may or may not have substantially the same shape as the outer container 110. For example, the outer container 110 may be a square or rectangular, while the inner container 120A may be a different polygon-shaped container, such as a triangle. Alternatively, the inner container 120A may fit into the outer container 110 such that the inner container 120A angles inward toward the center of the outer container. For example, the inner container 120A may angle inward at an angle of approximately 10 degrees or greater. Of course, the angle of the inner container 120A may be any angle suitable to minimize the probability that the tag may read from the exterior of the inner container 120A.

The one-time shield 130A may provide shielding to prevent an RFID tag on the product 140A from being read through the packaging. In this case, the one-time shield 130A may also be angled within the inner container 120A to reflect or absorb any signals transmitted toward the readable tag, or reflect any signals that may be emitted by the readable tag. The reflection of the signal may attenuate the signal strength at the reader to such a low signal strength that the tag is unreadable. To accomplish a similar function, the inner container 120A may have a corrugated surface, the one-time shield 130A may be corrugated, or both may be corrugated. The corrugated surface may scatter the signal transmitted from the reader or the signal emitted from tag. The combination of the outer container 110 and the inner container 120A may form a structurally secure package.

The one-time shield 130 may be made from different types of metalized paper or plastic, or metals in the form of a foil. The metal used in the foil or metalized paper or plastic may be aluminum, tin or any other malleable metal or combination of metals. The one-time shielding 130 may also be a screen with various different weaves. The one-time shielding 130 may be corrugated or smooth. The one-time shielding 130 may cause the reader signal to be reflected away from the packaging or attenuate the signal energy.

The one-time shielding 130 may fit into the inner container to sufficiently obfuscate the RFID tag so that it may not be read until the packaging is removed from the device. The one-time shielding 130 may be affixed to the inner container by an adhesive, a staple, a tab(s) inside the inner container 120A, or other affixing devices. The one-time shield 130A is shown in FIG. 1 as being approximately the same size as the inner container 120A. However, the one-time shield 130A may have smaller dimensions that may only provide shielding in the vicinity of the NFC tag. The one-time shield 130A may be sufficient to prevent the NFC tag from being read by an external NFC reader.

The one-time shield 130A may be integrated into the inner container 120A such as a metalized paper or plastic. The integration of the one-time shield 130A into the inner container 120A may be such that the combination acts as a single container when inserted into the outer container 110.

The product 140A may fit within the one-time shielding 130A such that when the product 140A is removed, the one-time shielding 130A is rendered unusable for providing further shielding. For example, if the product 140A were to be removed and a user attempted to repack the product 140A back into the packaging 100, the one-time shielding 130A would be useless as shielding and also have an appearance indicating that the product 140A was removed from the package 100. In this regard, the removal of the product 140A destroys the one-time shielding 130A.

The destruction of the one-time shielding 130A may be accomplished, for example, by securing the product 140A in a manner that the one-time shielding 130A tears along perforations (shown as dashed lines in 130A) as the product 140A is removed from the packaging. Alternatively, the packaging 110 may be constructed such that the inner container 120A may be damaged beyond reuse to remove the product 140A. For example, inner container 120A may be formed to fit snuggly around the product. This configuration is shown the adjacent implementation with respect to inner container 120B which is shown to fit the form of product 140B such that removing the product 140B would damage the inner container 120B beyond reuse. Note that product 140B may be substantially similar to product 140A. The inner container 120B may fit into the outer container 110.

The inner container 120B may be made from a material that provides sufficient shielding such as a metallic screen or metalized paper or plastic. The inner container 120B may also be configured to encapsulate a product 140B with a shielding material. For example, the inner container 120B may be divided into partitions that when fitted together encapsulate the product 140B.

During initial packaging of a partitioned inner container 120B, the partitions of the inner container 120B may be affixed to one another such that when the product 140B is removed from the inner container 120B such that any shielding material is no longer capable of sufficiently shielding the readable tag on the product 140B.

Alternatively, the shielding material in inner container 120B may be incorporated in a heat shrinkable material, or similar shrink-wrap material, that may allow the inner container 120B to encapsulate the product 140B. The shrink-wrap process may place the shielding material immediately adjacent to the readable label on the product. In the case of a readable label embedded within the product 140B, the shrink-wrapped inner container 120B may cover the product 140B either completely or to a degree that any signal to or from the readable tag is sufficiently attenuated or shielded to prevent reading of the tag information. When the shrink-wrapped inner container 120B is used, the removal of the inner container 120B from the product 140B may result in the destruction of the inner container 120B.

For example, inner container 120B may be brittle. In which case, the force of handling by a user may cause the inner container 120B to break into pieces that cannot be put back together without a subsequent user knowing that the package 100 was opened.

The shielding material 130A, alone or when incorporated into the inner container 120A, 120B may be configured or fabricated to provide sufficient shielding to block or attenuate any signals to a readable label to a signal strength insufficient to cause the label to respond, or, if the label were to respond, the returned signal may be so weak that the label reader may not detect the return signal. In addition, the shielding material 130A is unusable for subsequent repackaging of the product. Advantageously, the integrity of the readable label is insured both while in the packaging, and if the product was removed from the packaging, a subsequent purchaser would be able to readily determine that the product was re-packaged because the shielding material would indicate that the product was repackaged.

FIG. 2 discloses a method for packaging a product according to an implementation of the presently disclosed subject matter. The method 200 provides a process for packaging a product. At step 210, an outer container of a package may be provided for packaging a product. The inner container may be disposed within the outer container, for example, by inserting the inner container into outer container (step 220). The inner container may have a one-time shielding member disposed to obscure a radio frequency readable tag of a product from a radio frequency tag reader.

The removal of the product from the outer container may render the shielding unusable as subsequent shielding. The unusable shielding may not be used again as shielding should the product be repackaged using the same one-time shielding. For example, the one-time shielding may break when the product is removed from the packaging. The one-time shielding may break because it is formed from a brittle material, is formed to configure to the shape of the product, or may otherwise be configured to be damaged beyond reuse when removed.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
an outer container; and
an inner container disposed within the outer container having a one-time shielding member that is a brittle material and obscures a radio frequency readable tag of a contained product from a radio frequency tag reader, wherein removal of the contained product from the outer container breaks the shielding member which renders the shielding member unusable as a subsequent shielding member.

2. The system of claim 1, wherein the inner container conforms to the shape of the product with the shielding member covering the radio frequency readable tag.

3. The system of claim 1, wherein in the shielding member partially covers the product.

4. The system of claim 1, wherein the inner container is corrugated, and positioned within the outer container at an angle from an end of the outer container.

5. The system of claim 1, wherein the inner container is a paper or a plastic, and the shielding member is corrugated.

6. The system of claim 1, wherein the inner container is a paper or a plastic, and the shielding member is smooth.

7. The system of claim 1, wherein the inner container is a heat-shrinkable material that conforms to the shape of the product.

8. The system of claim 1, wherein the radio frequency readable tag is a near field communication label.

9. The system of claim 1, wherein the radio frequency readable tag is a radio frequency identification tag.

10. A method of packaging a product, the method comprising:
providing an outer container;
providing an inner container disposed within the outer container the inner container containing a product with a radio frequency readable tag; and
providing a brittle one-time shielding member disposed to obscure the radio frequency readable tag from a radio frequency tag reader and the shielding member is broken and rendered unusable as the shielding member by removal of the product from the outer container.

11. The method of claim 10, further comprises:
positioning the inner container within the outer container at an angle from an end of the outer container, wherein the inner container is corrugated.

12. The method of claim 10, wherein the shielding member partially covers the product.

13. The method of claim 10, wherein the inner container is a paper or a plastic, and the shielding member is corrugated.

14. The method of claim 10, wherein the inner container is a paper or a plastic, and the shielding member is smooth.

15. The method of claim 10, wherein the inner container is a heat-shrinkable material that conforms to the shape of the product.

* * * * *